Sept. 21, 1943.  W. SEIGLE  2,329,790
ILLUMINATED FISHING LURE AND LIGHTING UNIT THEREFOR
Filed Feb. 12, 1942
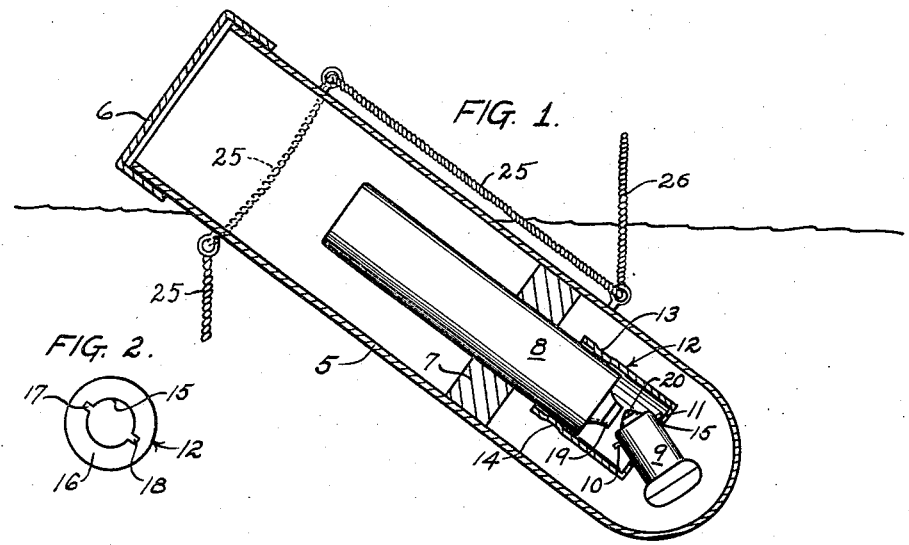
WILLIAM SEIGLE
INVENTOR
BY Hubert Miller
ATTORNEY Patented Sept. 21, 1943

2,329,790

UNITED STATES PATENT OFFICE 2,329,790

ILLUMINATED FISHING LURE AND LIGHTING UNIT THEREFOR

William Seigle, Hinton, Okla.

Application February 12, 1942, Serial No. 430,559

7 Claims. (Cl. 43—44)

This invention relates to improvements in illuminated fishing lures and floats, and is an improvement over inventions described in United States patents, Numbers 2,070,755 and 2,217,565 issued February 16, 1937, and October 8, 1940, respectively, both of which patents were issued to Maurice Seigle and myself as co-inventors.

It is the chief object of this invention to provide a fishing lure, float, or similar device which has a removable self-contained lighting unit which automatically lights due to the force of gravity when the device assumes any one of numerous positions in the water.

Another important object of the invention is to provide a lighting unit for such devices which is so simple in construction that it can be manufactured and sold at a much lower price than other similar devices now on the market.

Other important objects are: to provide a universal lighting unit which is adaptable for use in a night fishing float, and when so used will automatically light when the fish bites; and a unit which can also be used in a fishing lure or plug, and when so used can be adjusted so that the light will either flash on and off intermittently as the lure travels through the water, so that the light will burn continuously during use, or so that the light will not burn at all, and the same lure can be used for day fishing as well.

Another object is to provide a lighting unit for such devices which is so constructed that it can be easily and quickly installed in almost any kind, type, or size of lures or floats.

The details in the construction of two preferred forms of my invention, together with other objects attending its production, will be better understood from the following description when read in connection with the accompanying drawing, which is presented for illustrative purposes only, and in which Figure 1 is a longitudinal sectional view of a lure embodying the invention in one form, and showing a conventional hook-carrying line.

Figure 2 is a plan view showing details of the construction of one part of the Figure 1 embodiment; and Figure 3 is a longitudinal sectional view of another embodiment of the invention.

Referring to the embodiment illustrated in Figs. 1 and 2, it will be seen that this form of the invention includes a hollow water tight lure body 5, made of any material through which light may be transmitted and having a suitable water tight closure 6. The lure body may, of course, be of any desired size or shape. A perforated resilient plug 7 may be used as one of the most simple means of maintaining the lighting unit in any desired position within the lure body. The exterior cross sectional size and shape of this plug is complemental to the interior cross sectional size and shape of the lure body so that the plug and the lighting unit may be moved to any position with relation to the ends of the lure body. The perforation in this plug is of such size and shape as to snugly receive and grip a dry cell battery 8 of suitable size, at any point intermediate its ends.

In addition to the cylindrical dry cell battery 8, the lighting unit illustrated in Fig. 1 includes an ordinary non-threaded cylindrical base light bulb 9 having a plurality of laterally projecting electrically conductive pins 10 and 11 near its contact end. As a means of holding the bulb in proximity to the output end of the battery for limited gravitational movement in various directions with relation thereto, I provide an electrically conductive cap 12, one end of which is of a size to fit tightly on the output end of the battery 8. A tight press fit may be obtained by providing indentations in the cap, as at 13 and 14. The opposite end of the cap is provided with a perforation 15 which is slightly greater in diameter than the bulb base. The annular flange 16 (Fig. 2) surrounding this perforation is provided with a plurality of notches 17 and 18, which are so spaced and of such size as to admit the plurality of pins 10 and 11 on the bulb base when the bulb is rotated to the proper position.

After the cap 12 has been placed in position on the battery and the base of the bulb has been inserted into the cap, the bulb is partially rotated. The pins 10 and 11 on the bulb base, and the flange 16 on the cap 12 thus normally limit the gravitational movement of the bulb away from the battery, but since the perforation 15 is larger than the bulb base, the bulb is free to assume various positions as the position of the battery is changed. Naturally, whenever the central contact element 19 of the bulb contacts the central contact element 20 of the battery, the electrical circuit thru the battery and bulb is closed, and the bulb is lighted.

When the body 5 is used as a night fishing float, the lighting unit is preferably positioned so that the light bulb is adjacent one end of the body, as in Fig. 1, and the weight of the unit keeps that end of the float submerged. The weight of the bulb causes it to move away from the battery, and to remain near the remote end of the cap so long as this end of the float is submerged. With the hook carrying line 25 attached to the opposite end of the body, it is plain to see that the pull of the fish on the line will change the tilt of the lighting unit, and the force of gravity will cause the bulb to move into contact with the battery and light, thus signalling the fisherman that he has a bite. The reference numeral 26 indicates the portion of the line 25 which leads to the fisherman's fish-rod.

If the body 5 is to be used as an intermittently flashing lure, the battery end of the lighting unit is preferably positioned near the rear end of the lure, as in Fig. 3. The weight of the lighting unit makes that end of the lure lie low in the water, thus giving the battery and its cap an upward tilt. As the lure is drawn through the water, the resistance of the water causes the forward end of theh lure to bounce, causing the bulb to repeatedly move into and out of contact with the battery. If it is desired for the light to burn continuously, it is only necessary to force the output end of the battery into the cap 12 until the contact element 20 forces the bulb to the opposite end thereof, thus closing and maintaining the electrical circuit through the bulb and battery.

Referring to the Figure 3 embodiment of the invention, the chief difference lies in the fact that this construction permits the use of a standard threaded base bulb 9A instead of a cylindrical base bulb 9. In this embodiment an internally threaded socket 21 is provided, its exterior wall being cylindrical. Movement limiting means, such as an annular flange 22 (or stop pins as in Fig. 1) is provided near one end of this socket, and its length is such that when its opposite end seats against the glass portion of the bulb, the contact element 19A of the bulb protrudes beyond the flanged end of the socket, thus permitting direct contact between the bulb and battery contact elements without any interference by any part of the socket.

The remaining parts of this embodiment may be identical to the Fig. 1 embodiment, like numerals followed by the letter A indicating like parts in the two embodiments.

While I have described and illustrated only two specific embodiments of the invention I am aware that the invention may be embodied in other forms, and I do not wish my patent protection limited save by the scope of the appended claims.

I claim:

1. A lighting assembly comprising: a dry cell battery; a light bulb; an electrically conductive perforated cap adapted to fit with electrical contact on the output end of said battery; and means for mounting said bulb in said cap for limited gravitational movement in various directions as the battery changes positions, whereby when the bulb moves to any one of several positions with relation to said battery the electric circuit through the bulb and battery is closed, and when the bulb moves to any one of numerous other relative positions the circuit is broken.

2. A lighting unit comprising: a dry cell battery; an electrically conductive, perforated, tight fitting cap for the output end of said battery; an electrically conductive bulb socket mounted for limited movement in various directions in said cap; and a light bulb mounted in said socket and having its contact end protruding beyond the inner end thereof, whereby the central contact element of said bulb may move by force of gravity into and out of contact with the central contact element of said battery as the battery changes positions, thus making and breaking the electrical circuit through said bulb and battery.

3. In combination with a hollow light transmitting fishing lure body, a lighting unit comprising: a dry cell battery; an electrically conductive, perforated, tight fitting cap for the output end of said battery; an electrically conductive bulb socket mounted for limited movement in various directions in the perforation of said cap; a light bulb mounted in said socket with its central contact element protruding beyond the inner end thereof for contact with the central contact element of said battery; and means for mounting said battery against longitudinal movement in said lure body.

4. A fishing device comprising: a hollow, light transmitting body; a water tight closure therefor; a dry cell battery mounted within the body; an electrically conductive, perforated cap for the output end of said battery; a light bulb; and means for mounting said bulb in said cap for limited gravitational movement in various directions with relation to the output end of said battery as the device changes positions.

5. A light assembly comprising: a dry cell battery; an electrically conductive cap covering the output end of said battery, said cap having a central perforation in its outer closed end; and a light bulb pivotally mounted in said perforation proximate to said end of said battery for limited gravitational movement into various positions with relation to the battery as the battery changes positions, whereby such movement of the bulb in the cap makes or breaks the electrical circuit through the battery, the cap and the bulb.

6. In combination with a hollow, light transmitting fishing lure body, a lighting unit comprising: a dry cell battery; an electrically conductive cap covering the output end of said battery, said cap having a central perforation in its outer closed end; a light bulb pivotally mounted in said perforation proximate to said end of said battery for limited gravitational movement in various positions with relation to the battery as the battery changes positions, whereby such movement in the bulb in the cap makes or breaks the electrical circuit through the battery, the cap and the bulb; and means for selectively positioning said battery in various longitudinal positions within the said body.

7. In combination with a hollow light transmitting fishing lure body, a lighting unit comprising: a dry cell battery; an electrically conductive, perforated, tight fitting cap for the output end of said battery; an electrically conductive bulb socket mounted for limited movement in various directions in the perforation of said cap; a light bulb mounted in said socket with its central contact element protruding beyond the inner end thereof for contact with the central contact element of said battery; and means for selectively positioning said battery in various longitudinal positions within the body.

WILLIAM SEIGLE.